Dec. 12, 1933.     A. J. MUSSELMAN     1,938,606
BRAKE
Filed Oct. 4, 1929
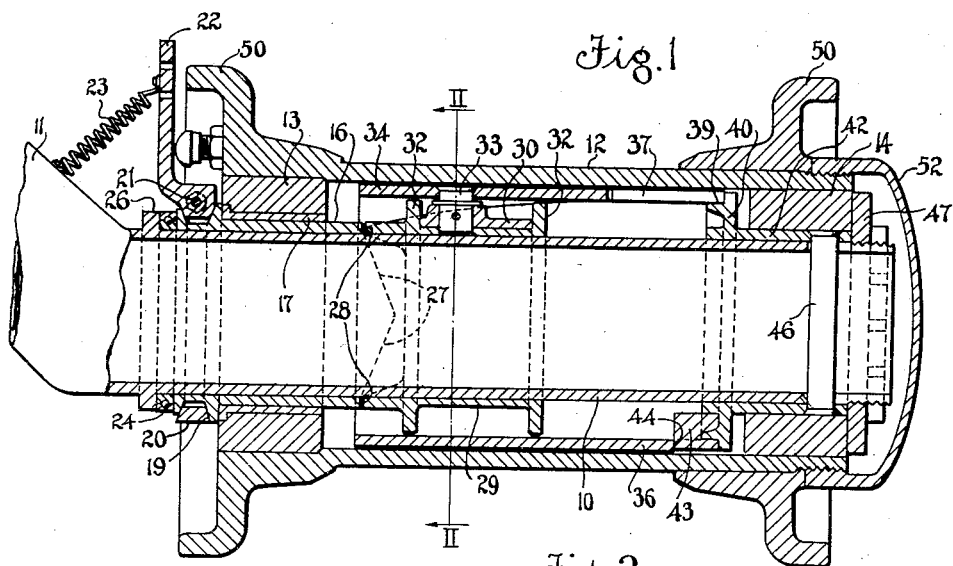
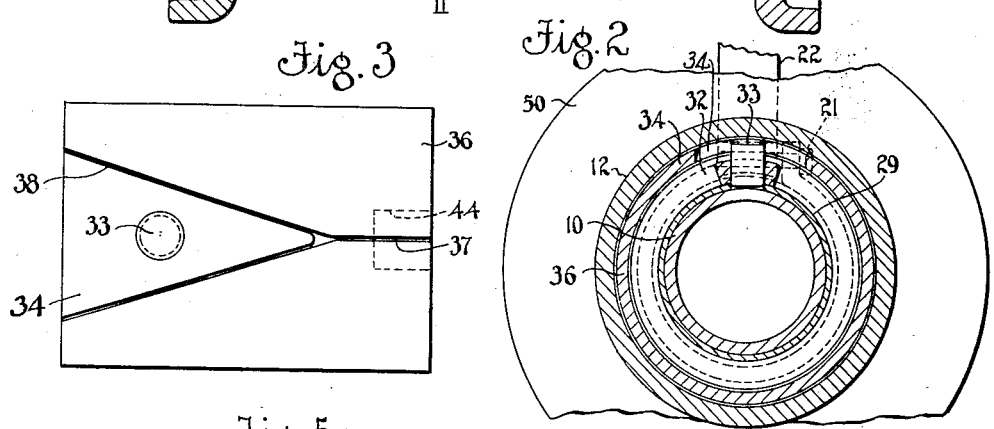
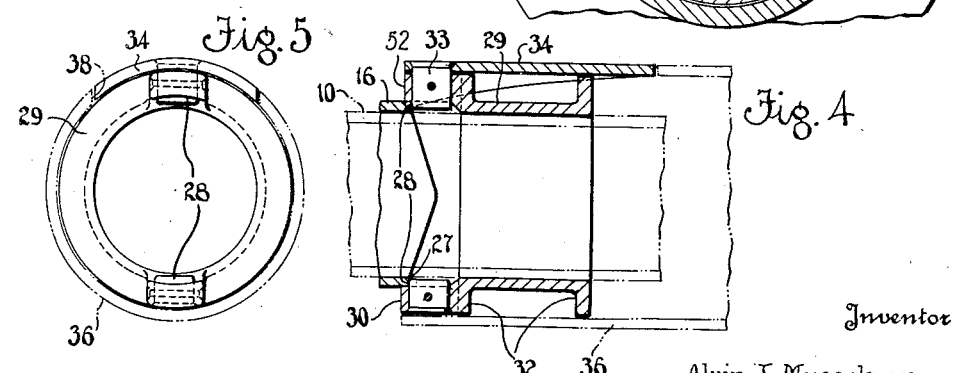
Inventor
Alvin J. Musselman
By
Attorney Patented Dec. 12, 1933

1,938,606

UNITED STATES PATENT OFFICE 1,938,606

BRAKE

Alvin J. Musselman, Akron, Ohio, assignor to Wingfoot Corporation, Wilmington, Del., a corporation of Delaware Application October 4, 1929. Serial No. 397,391

8 Claims. (Cl. 188—18)

This invention relates to wheel brakes and it has for its primary object the provision of an expanding type of brake particularly adapted to be employed in conjunction with the wheels of aircraft landing gear.

Another object of the invention is to provide a brake which is composed of relatively few elements, and which is of such size as to be confined entirely within the stream lines of a tire wheel of an aircraft landing gear.

Another object of the invention is to provide a brake which is so constructed as to be insured against locking and by which braking force can be applied by operating an actuating member in two directions from a normal inoperative position.

For a better understanding of the invention, reference may now be had to the accompanying drawing, forming a part of the specification, of which;

Figure 1 is a longitudinal sectional view of a wheel hub having a brake incorporated therein;

Figure 2 is a cross-sectional view taken substantially along the line II—II of Figure 1;

Figure 3 is a plan view of one of the principal braking elements of the device;

Figure 4 is a fragmentary cross-sectional view of another form of one of the braking elements; and Figure 5 is an elevational view of the central element shown by Figure 4.

In practicing the invention, an axle or shaft 10 of an aircraft landing gear 11 is provided with a hub barrel 12 that is rotatably mounted upon annular bearing rings 13 and 14. A collar 16 rotatably mounted upon the axle is provided with a bearing bushing 17 for supporting the ring 13. One end portion of the collar is provided with an annular groove 19 in which an annular strap 20 of an actuating arm 22 is secured. The faces of the collar defining the groove 19 converge and the corresponding faces of the annular strap of the arm likewise converge, and by tightening a bolt 21 threaded in the arm the strap is wedged tightly and adjustably about the end portion of the collar. A spring 23 connected at opposite ends to the arm 22 and landing gear 11, respectively, yieldably resists movement of the arm in either direction from its normal position. A suitable actuating mechanism (not shown) may be secured to the arm for operating the brake.

One end of the collar 16 is provided with a thrust ball bearing 24 which abuts against the collar and against an annular shoulder 26 formed upon the axle 10. The other end of the collar is provided with a cam surface 27 which engages complemental cam surfaces 28 of a collar 29 that is slidably mounted upon the axle in axial alignment with the collar 16. Relative axial movement of the collar 29 is effected whenever one of the collars 16 or 29 is rotated in either direction from the position shown by Figure 1.

A lug 30 secured between a pair of annular flanges 32 of the collar 29 is provided with a rivet or bolt 33 extending therethrough and having its inner end secured to the collar 29 while its outer end is secured to a wedge 34. An expansible cylindrical sleeve 36 having a split 37 therein is also provided with a wedge-shaped opening 38 that corresponds in shape substantially to the shape of the wedge 34. It will be observed that the wedge constitutes substantially a continuation of the cylindrical configuration of the sleeve 36. The apex of the wedge-shaped opening communicates with the split 37, and the sleeve is substantially centered within the hub barrel upon the annular flanges 32 and upon a shouldered portion 39 of a flange 40 that forms an end portion of a bearing collar 42.

In order to prevent relative rotation between the sleeve 36 and the axle 10, a lug 43 is rigidly secured to the flange 40 and normally is disposed within a notch 44 at the outer edge of the sleeve. Also, a bolt 46 extending through the collar 42 and axle 10, rigidly secures these elements together. The bearing ring 14 rests upon the collar 42 adjacent the flange 40 and a castellated nut 47 threaded upon the end of the axle maintains the bearing ring upon the collar 42. Thus, the sleeve 36 is secured or keyed against rotation with respect to the axle 10. Tire retaining flanged rings 50 are mounted upon the hub barrel and a protective cap 52 is threaded upon the outer end of the hub barrel to prevent foreign particles from affecting the inclosed braking elements.

In Figures 4 and 5 the collar 29 is substantially the same as the collar 29 shown by the other figures, with the exception that the cam surfaces 27 and 28 are arranged somewhat differently. However, they operate in substantially the same manner, and a lug 52 providing a rigid support for the rivet 33 is outside the flanges 32 instead of being between them in the position of the similarly functioning lug 30. By actuating the arm 22 either in a clockwise or counter-clockwise direction, as viewed in Figure 2, the wedge 34 is moved into the opening 38 to expand the sleeve 36 into braking engagement with the inner surface of the hub barrel 12.

From the foregoing description it will be apparent that the brake is extremely simple in construction and operation, and that it can be installed for practical operation within a relatively small hub barrel. The braking elements always tend to resume their inoperative positions as soon as the braking force is released.

Although I have illustrated only the preferred forms which the invention may assume, and have described those forms in detail, it will be apparent to those skilled in the art that the invention is not so limited, but that various modifications may be made therein without departing from the spirit of the invention or from the scope of the appended claims.

What I claim is:

1. A wheel brake comprising an axle, a hub barrel having means for rotatably mounting it about the axle in spaced relation thereto, a split cylindrical sleeve having a wedge-shaped opening communicating with the split portion of the sleeve within the hub barrel, a collar having two symmetrical cam portions, a segment of a cylinder secured to the collar and disposed within the wedge-shaped opening, a cam mounted upon the axle for engaging the cam portions of the collar, said cam being rotatable in opposite directions for actuating the collar in only one axial direction, and means for actuating the cam.

2. A wheel brake comprising an axle, a hub barrel having means for rotatably mounting it upon the axle in spaced relation thereto, an expansible split sleeve having means for keying it with respect to the axle, a pair of collars having normally engaging cam surfaces mounted directly upon the axle, a member secured to one of the collars for engaging the split portion of the sleeve, and means for actuating the other collar to move the member in the split portion of the sleeve for expanding the latter.

3. A wheel brake comprising an axle, a hub barrel having means for rotatably mounting it upon the axle in spaced relation thereto, a sectional sleeve having one portion movable to expand another portion thereof, and a rotatable actuating member cooperating with said movable portion of the sleeve to expand said other portion of the sleeve against the hub barrel when said member is rotated in a clockwise direction and also when said member is rotated in a counter-clockwise direction.

4. A wheel brake comprising an axle, a hub barrel having means for rotatably mounting it upon the axle in spaced relation thereto, a split sleeve having a portion provided with angular edges, means engaging the angular edges and movable to expand the sleeve, and a rotatable actuating member cooperating with said last named means to expand the sleeve against the hub barrel when said member is rotated in a clockwise direction and also when said member is rotated in a counter-clockwise direction.

5. A wheel brake comprising an axle, a hub barrel having means for rotatably mounting it upon the axle in spaced relation thereto, a sectional sleeve secured against rotation with respect to the axle and having one portion movable to expand another portion thereof, said movable portion of the sleeve having cam surfaces cooperating therewith, and a rotatable actuating member having cam surfaces coacting with said first named cam surfaces to move said movable portion of the sleeve and thereby expand said other portion of the sleeve against the hub barrel when said member is rotated in a clockwise direction and also when said member is rotated in a counter-clockwise direction.

6. A wheel brake comprising an axle, a hub barrel having means for rotatably mounting it upon the axle in spaced relation thereto, a split sleeve secured against rotation with respect to the axle and having a wedge-shaped opening communicating with the split portion of the sleeve within the hub barrel, a wedge-shaped member normally disposed in the wedge-shaped opening and movable to expand the sleeve, said wedge-shaped member having cam surfaces cooperating therewith, and a rotatable collar having cam surfaces coacting with said first named cam surfaces to move said wedge-shaped member and thereby expand said sleeve against the hub barrel when said collar is rotated in a clockwise direction and also when said collar is rotated in a counter-clockwise direction.

7. In a brake of the character described, in combination, a pair of circular members one spaced within the other whereby one of said members is relatively rotatable with respect to the other, a brake sleeve arranged in the space between the members and normally held out of but movable into braking engagement with one of said members, a collar rotatably mounted in the space between the members and having means cooperating with the brake sleeve to move the latter into braking engagement with one of said members when said collar is rotated in a clockwise direction and also when said collar is rotated in a counter-clockwise direction.

8. A combination as recited in claim 7 wherein the brake sleeve is sectional, one of the sections having cam surfaces cooperating therewith, said collar also having cam surfaces coacting with the first named cam surfaces to move the sleeve into braking engagement with one of the members.

ALVIN J. MUSSELMAN.